US008484758B2

(12) United States Patent
Martines et al.

(10) Patent No.: US 8,484,758 B2
(45) Date of Patent: Jul. 9, 2013

(54) APPARATUS AND METHOD FOR THE FUNCTIONALISATION OF AFM TIPS

(75) Inventors: Elena Martines, San Sebastian (ES); Isabel Garcia Martin, San Sebastian (ES); Soledad Penades Ullate, San Sebastian (ES)

(73) Assignee: Centro de Investigacion Cooperativa en Biomateriales (CIC Biomagune), San Sebastian (ES)

( * ) Notice: Subject to any disclaimer, the term of this patent is extended or adjusted under 35 U.S.C. 154(b) by 55 days.

(21) Appl. No.: 13/262,475

(22) PCT Filed: Mar. 29, 2010

(86) PCT No.: PCT/EP2010/054056
§ 371 (c)(1),
(2), (4) Date: Nov. 15, 2011

(87) PCT Pub. No.: WO2010/112440
PCT Pub. Date: Oct. 7, 2010

(65) Prior Publication Data
US 2012/0096602 A1    Apr. 19, 2012

(30) Foreign Application Priority Data
Mar. 31, 2009 (EP) .................................. 09382042

(51) Int. Cl.
*G01Q 60/42* (2010.01)
*G01Q 60/38* (2010.01)
*G01Q 70/18* (2010.01)
(52) U.S. Cl.
USPC ................... 850/42; 850/61; 850/40; 73/105

(58) Field of Classification Search
USPC ...... 850/40, 42, 45, 48, 52, 53, 60, 61; 73/105
See application file for complete search history.

(56) References Cited

U.S. PATENT DOCUMENTS

| 2005/0133372 A1* | 6/2005 | Zhou et al. ............... 204/471 |
| 2007/0186629 A1* | 8/2007 | Chang et al. ............... 73/105 |
| 2008/0061231 A1* | 3/2008 | Chamberlin et al. ......... 250/306 |
| 2008/0179206 A1* | 7/2008 | Feinstein et al. ............. 206/305 |

FOREIGN PATENT DOCUMENTS

| JP | 9-145726 | 6/1997 |
| WO | WO 2008/002922 A2 | 1/2008 |

OTHER PUBLICATIONS

Christian K. Riener, et al, "Simple test system for single molecule recognition force microscopy", Analysis Chimica Acta, vol. 479, XP002542453, 2003, pp. 59-75.

* cited by examiner

*Primary Examiner* — Robert Kim
*Assistant Examiner* — David E Smith
(74) *Attorney, Agent, or Firm* — Oblon, Spivak, McClelland, Maier & Neustadt, L.L.P.

(57) ABSTRACT

The present invention includes an apparatus that holds the probes to a solid support throughout the passages of the functionalization process, thus avoiding user-dependent breakage or damage of the fragile AFM cantilevers. The apparatus allows the tips of the AFM probes to be placed face-down, which avoids the deposition of contaminants on their functional side. The device also allows functionalizing the tips with small liquid volumes and cleaning. The present invention includes a functionalization process preventing non-specific adsorption of molecules on the tip.

15 Claims, 6 Drawing Sheets

APPARATUS AND METHOD FOR THE FUNCTIONALISATION OF AFM TIPS

TECHNICAL FIELD OF THE INVENTION

The present invention refers to a method and apparatus for the preparation of Atomic Force Microscopy (AFM) probes via functionalisation processes, and more particularly, to a low friction, chemically inert holder that allows secure holding of the probes during all the steps of the functionalisation process, thus removing the possibility of probe contamination and operator mishandling.

STATE OF THE ART

Atomic Force Microscopy (AFM) is the most widely used technique from the family of Scanning Probe Microscopy, and it has become a powerful tool for studying and imaging biological samples at the nanoscale. AFM is based on the detection of the action of a local force between the surface atoms of a sample and the atoms of a tip, the latter being attached to a force sensor.

In order to measure biomolecular interactions by AFM force measurements, the most commonly used force sensor is a micro-cantilever fabricated from a wafer of silicon or silicon nitride. Thus, the cantilevers protrude from a silicon (nitride) chip. The tip is fabricated or attached onto the force sensor (the cantilever) that allows the detection of the force. In order to probe only local interactions, this tip is very sharp, as it usually has apex radius dimensions less than a micrometer or even a few tens of nanometers. Herein, the term probe comprises the chip, at least one cantilever and its respective tip. The most common detection technique measures a change in cantilever deflection due to a force exerted at the end of the cantilever, by using a focused laser beam that is reflected at the free end of the cantilever, above the tip. The cantilever deflection is usually detected by a precise displacement detector, such as an interferometer or a photodiode.

Because of their resolution and versatility, AFMs are important measurement devices in many diverse fields ranging from semiconductor manufacturing to biological research. Unbinding forces are detected as rupture events which are sensed by the cantilever deflection, yielding a map of recognition sites that may be combined with further acquired information such as simultaneous monitoring of sample topography. Also, specific unbinding forces yield information about the association and dissociation kinetics of ligand-receptor interactions, protein unfolding patterns, etc. The oscillation and bending of the cantilever in the elastic regime allows measurements of force gradients or forces ranging from a few tens of pN up to tens of nN. The required elastic properties of the cantilevers depend on the specific application.

An AFM can be used as a single-molecule biosensor by coupling a ligand molecule to the tip, which is moved over the sample surface and recognized by complementary receptor molecules on the sample surface. By measuring unbinding forces between receptor-ligand pairs, the AFM not only allows to measure specific interactions between single molecules, but it also allows these interactions to be measured in physiological conditions. For instance, the kinetics of receptor-ligand interactions can nowadays be measured directly on live mammalian cells. The required chemically-modified (or functionalised) AFM probes—now comprising the chip, the cantilever and the functionalised tip—are obtained by tethering specific molecules to the tip, which are used in receptor-ligand experiments for the measurement and mapping of specific interactions. Such specific interactions are involved in many important biological processes, and their selectivity and specificity are widely exploited in nanobiotechnology for developing bioanalytical and biomedical devices such as biosensors. Thus, in order to supply functionalised probes for reliable biosensing AFM measurements, it is necessary that these probes are free of contaminants at the tip apex.

The manipulation of the probe during the functionalisation process frequently leads to breaking the cantilevers protruding from the chip. AFM probes are quite small and fragile, because their reduced dimensions ensure that the cantilevers have the required elastic properties (stiffness in the range 0.01-100 N/m). Current functionalisation procedures involve grabbing each probe individually, and place it sequentially in several vessels containing the appropriate cleaning, reactive and washing solutions. During such procedures, accidents are very likely to occur even for a skilled person: for example, if the probe is held by mechanical means such as tweezers, then the force exerted by the tweezers on the chip even during careful handling could lead to an accidental slip that may damage or break the cantilevers and/or the tips. Said risk is increased when the chip is in a liquid environment, where liquid lubrication makes undesired slip events more likely to occur. It is thus important to reduce the risk of damaging the tip due to user mishandling during the functionalisation.

During the functionalisation procedures the probes are dipped into different solutions, and it is important that during these steps the surfaces are not exposed to contaminants. Contamination is particularly common in non-controlled environments, other than clean rooms or the like. Particularly, the common clamp-shell shipping and packaging material for commercial AFM probes (Gel-Pak®, a registered trademark of Gel-Pak LLC Ltd of Sunnyvale, Calif.) leaves a contamination layer on the cantilevers (Y. Lo, N. D. Huefner, W. S. Chan et al., Langmuir 15, 6522 (1999)). Even though silicon probes can be chemically cleaned by dipping into a Piranha solution ($H_2SO_4/H_2O_2$ 7:3), or physically cleaned by etching them in $O_2$ plasma, it is important to notice that these standard techniques cannot be used in order to remove contamination once it has reached the tip of a functionalised AFM probe, because these cleaning techniques would destroy the functional molecules. Also, ultrasonic cleaning must be generally avoided on AFM probes because it can physically damage the tip, as it is known that nanofabricated features (such as AFM tips) can be totally destroyed by sonication. Moreover, sonication could lead to degradation processes of the biomolecules, such as the denaturation of proteins. Therefore, it must be emphasised that it is necessary to find a way to keep the functionalised probes clean during all the functionalisation steps, preventing their exposure to contaminants.

In order to functionalise silicon AFM probes, the freshly-cleaned probes must be immediately silanised to avoid deactivation of the surface. Silanisation is achieved by reacting silicon with trichloro- or trialkoxyl-silane derivatives. Once deposition occurs a chemical (oxane) bond forms with the surface yielding a permanent modification of the substrate. This technique is widely used for its accessibility, both in terms of equipment and of financial cost; however it relies on the use of water-sensitive reactants, which can easily polymerize to form aggregates that can deposit on the surfaces, thus leading to a change in topography of the silicon surface. This is problematic when coating micro- and nano-structures, such as AFM cantilevers and tips that cannot be sonicated to remove aggregates. Vapour phase silanes can also be used to modify surfaces in dry aprotic conditions, however silanisation in liquid remains a more widely used and easier-to-handle technique. Despite all the above-mentioned techniques, no device or defined method is currently available to ensure aggregate-free, reliable silanisation of AFM probes.

Moreover, as during the functionalisation procedures the probes are dipped into different solutions, and it is important to avoid user-dependent mishandling errors. For this reason it would be desirable to fasten the probes during the functionalisation steps, in order to avoid manual grabbing by tweezers. Although adhesives means, e.g., pressure-sensitive adhesives like in the Gel-Pak®, could be used as a non-scratching and easily removable media, these adhesives must be avoided in order to prevent contamination. It is thus important that any apparatus fastening AFM probes can be easily handled in order to perform the procedures in a fast, safe and reliable way, and on the other hand that such apparatus ensures cleanliness during probe functionalisation.

Finally, tip replacement during AFM experiments is frequent, because the experimental procedure involves a degradation of the probe performance that frequently leads to employing several of these probes. Accordingly, devices and systems that result in fine, reliable and cost-cutting handling while applying functionalisation processes are important. Moreover, bio-active functionalisation requires expensive products; therefore it is necessary to use minimal amounts of material.

SUMMARY OF THE INVENTION

It is an object of the invention to provide an apparatus and method for the cleaning, silanisation and functionalisation of AFM probes and small surfaces, which keep the AFM probes and small surface to be functionalised free of contaminants and aggregates during all the cleaning, silanisation and functionalisation steps, by preventing their exposure to contaminants, thereby avoiding surface roughness artefacts, non-specific force measurements and other undesired contamination-induced effects, combined with a reliable and easy way to extract the probes and fine, reliable and cost-cutting handling. The apparatus presented herein allows to place the tips face-down to avoid the deposition of aggregates or contamination from the solution. This and other objects of the invention are achieved by the apparatus, defined by the independent claim 1, and the method, defined by independent claim 13. Further aspects of the invention and favourable embodiments are described by the dependent claims.

In a first inventive aspect, the apparatus discloses a holder comprising two parts. Contact is made between the first part and the second part, defining two contact surfaces, one in each part. An AFM probe is placed in a probe receptacle located on the surface of the first part. As well, the AFM probe could be replaced by any surface like those used as sample in AFM experiments, although during the application the term "probe" or "AFM probe" will be used. As explained below, the second part presses the probe against the first part when they are brought into contact and fastened by any means. As a result, the probe is held securely between the first and the second part of the holder.

In order to make proper contact, the first part has at least one substantially flat surface, with at least one probe receptacle. This probe receptacle is located on the surface of the first part. Given that the AFM probes comprise chips with a rectangular shape, the probe receptacle is a groove. This probe receptacle allows the chip to move along the longitudinal direction of the groove, and constrains the movement of the chip along the transversal direction. The groove is slightly wider than the cantilever, being the width of commercial cantilevers about 1.5 mm typically. This ensures that the most fragile parts (the cantilevers and the tips, protruding from the smaller sides of the chip) do not touch the lateral surfaces of the probe receptacle, while still allowing the use of tools for handling the probes, e.g. tweezers.

A second part has at least one substantially flat surface, in order to make contact with the face of the first part. At least one element protrudes from this surface of the second part a distance similar to the depth of the groove of the probe receptacle. This protrusion fits into the groove in order to hold the AFM probe when the two parts are brought into contact since the width of the protrusion is smaller than the width of the groove of the probe receptacle. The protrusion does not touch the cantilever(s) in the AFM probe since the protrusion maximum length along the longitudinal direction of the groove of the probe receptacle is smaller than the length of the chip, so that it does not touch the cantilever(s) located at the end(s) of the chip. Although the chip length may change from vendor to vendor, usually this length is about 3.5 mm.

The first and the second part of the holder are kept in contact by using fastening means. Thanks to these means, the holder is assembled and the AFM probes can be kept fastened during any manipulation, such as cleaning, silanisation and functionalisation steps. The fastening means allow easy disassembling of the second part of the holder from the first part, which as disassembling is needed to remove the AFM probes from the holder. Advantageously, the fastening means allow to set the compressive force exerted on the chip by the holder.

The bottom part of the probe receptacle is a substantially flat surface, where any minute protuberance is avoided. This feature ensures that the pressure exerted by the protrusion of the second part, while pressing the probe against the bottom surface of the probe receptacle, will not lead to any undesired stress on the chip, and avoids any possible fracture of the chip while securing its position in the holder.

Because of the pressure exerted on the probe by the protrusion of the second part of the holder, adhesion and/or friction is reduced to a minimum in order to prevent any undesired handling of the probe when it is extracted from the holder. This is achieved by using a material which shows a low adhesive behaviour. Said material covers at least all the surfaces of the holder in contact with the probe. As a consequence, when this second part is brought out of contact the probe does not adhere to the any surface but lies on the probe receptacle. The holder also prevents any scratching of the probe silicon or conductive/reflective coatings, if in addition a low friction material is used. This is ensured if the friction coefficient is close or lower than 0.04.

At least the parts of the holder in contact with solutions and the probe are made of a material presenting not only a low adhesive behaviour but chemically inert, thus ensuring that the reactions between chemical species in the liquid and in the surfaces of the holder are reduced to a minimum. As a consequence, the inhibition of such processes helps avoiding the presence of non-desired chemical species on the critical AFM probe zone, namely the apex of the tip. The use of acid-resistant materials allows acid-cleaning the tips prior to further chemical modifications. Therefore if the whole holder is introduced in a vessel, all surfaces should be covered with said chemically inert material, or furthermore, the whole holder could be made of said chemically inert material.

Further, the contact area between the protrusion of the second part of the holder and the probe is small, and thus a relative high pressure is exerted on the probe when they are brought into contact. The stiffness of the element that protrudes from the surface is lowered by the use of a soft material. The relative low Young modulus of plastics allows achieving a protrusion of the surface with a lower stiffness than the probe, so that it can accommodate the main part of the deformation when the two parts are brought into contact. Thus, a wider range of pressures are allowed despite the small contact area between the probe and the protrusion. Moreover, its elastic properties allow this protrusion to fasten chips of different thicknesses, being that thickness usually ranging from 0.3 to 0.5 mm.

The holder design also ensures that the presence of air bubbles is minimized, as in functionalisation processes air bubbles impede the contact between the surface to be functionalised and the solution containing the active molecules (Piranha, silanes, proteins, etc.), thus leading to failure of the functionalisation process. In order to provide a bubble-free environment during the functionalisation process, the edges of the probe receptacle are substantially tilted with respect to the flat surface of the probe receptacle. Those tilted edges allow the bubbles to escape if the holder is dipped into a solution face-down, thus ensuring that the functionalisation occurs in a bubble-free environment. In addition to the tilted edges, the holder advantageously can comprise a plurality of bores to let air bubbles escape.

Furthermore, the probe receptacles can have no edge at all, which also facilitates air escape.

As a means to avoid aggregate deposition on the tips, detachable supporting means can be fixed to the first part of the holder. Those detachable supporting means are located on the face of the first part of the holder that contacts with the second part of the holder, namely on the side of the probe receptacles. Hence, when the holder sits on the supporting means, the probes are facing downwards, towards the bottom of the vessel containing the holder, so that any aggregate would deposit on the other side of the cantilever and not on the tip The supporting means therefore allow an adjustable spacing apart of the probe from the bottom of any vessel during functionalisation processes. These supporting means keep the probes facing downwards at a distance apart from contaminants or aggregates, which would sediment on the bottom of the vessel.

On the other hand, since the supporting means are detachable, they can be removed when there is a need to place the holder in such a way that the probes are facing upwards. For instance, when tip functionalisation requires using minimal amounts of reagents, the probes receptacle can be used as a small reaction vessel; or when the whole holder must be fit inside a closed vessel, the supporting means can be removed to ensure a better vessel fit.

Also, a detachable handle can be mounted on the first part of the holder for manipulating and moving it with ease during the functionalisation procedures. The handle can be removed to close the holder in any vessel.

In a second aspect a method for functionalisation of AFM probes is described. Using the above-mentioned apparatus, it is possible to define a method for the functionalisation of the AFM probes.

Firstly, at least one probe is placed in the AFM probe receptacle of the first part of the holder. The tips of the probe are pointing upwards so that they do not touch any surface of the probe receptacle, in a so-called face-up position. The AFM probe location may be corrected to align the chip of the probe with the protrusion of the second part of the holder. When the second part is assembled, its protrusion fits into the probe receptacle and comes into contact with only a portion of the chip of the AFM probe, because its dimensions are smaller than those of the chip. The first and the second part are kept in contact by at least one fastening mean, and the probe is blocked in the probe receptacle by the protrusion of the second part.

The holder is then turned upside-down, so that the tips of the probe point downwards, in a face-down position. The probe is cleaned, removing contaminants from the probe by using a cleaning process (chemical or physical). For instance, the probes can be cleaned using an etching solution like Piranha. Alternatively, the probes can be cleaned by plasma etching, in which case it is not necessary to place them face-down.

In the case of silicon probes, they are immediately silanised after cleaning, following different procedures. For instance, liquid phase silanisation can be carried out if the clean AFM probes mounted in the holder are immediately immersed in a solution of a silane compound, for instance 3-aminopropyldimethylethoxysilane in dry toluene. It is important during liquid-phase silanisation that the holder ensures that the tips are facing downwards, and the holder supporting means ensure that they are far from the bottom of the vessel, where silane aggregates could deposit. Gas phase silanisation can be also performed if the AFM probes mounted in the holder are placed in a desiccator in suitable conditions.

After silanisation, the tip can be functionalised with a linker chain terminating with a reactive group which can attach a biofunctional molecule, such as a maleimide group. Then, a filler layer of shorter unreactive linker chains can be anchored to the surface in several cycles, in order to prevent the non-specific adsorption of both high-molecular- and low-molecular-weight proteins. For instance, see the method developed by Uchida et al. for PEG layers (K. Uchida et al., *Analytical chemistry* vol. 77 (4), page 1075, 2005).

After the linker-anchoring step, the tip face-up position is recovered by turning the holder in a face-up position in order to incubate the tips with a small quantity of the desired active molecules in the probe receptacle. For instance, bio-functionalisation of the probe is achieved by tethering biomolecules through a functional group, such as a thiol. The biomolecules are coupled to the reactive outer end of the reactive linker chain, while shorter unreactive filler chains can prevent physisorption and therefore non-specific interactions.

Similar procedures are used for silicon tips and gold-coated tips. If the AFM probe is gold-coated, the above-mentioned cleaning procedures can be used to pass directly to the functionalisation steps. For instance, in case of cysteine-presenting proteins, the thiol group can be used with a maleimide-presenting linker.

Advantageously, the liquid wasted during the functionalisation procedure is reduced to a minimum, because the probe receptacle can be filled with small volumes of liquids, ranging from a few micro liters. Moreover, a plurality of probe receptacles can be easily implemented on the same apparatus, arranging the grooves in such a way that allows the user to functionalise a set of probes with a minimum amount of liquids and time. Thus, several probes can be functionalised optimizing the cost.

BRIEF DESCRIPTION OF THE DRAWINGS

The invention will be better understood and objects other than those set forth above will become apparent when consideration is given to the following detailed description thereof. Such description makes reference to the annexed drawings, wherein.

PREFERRED EMBODIMENT OF THE INVENTION

In one preferred embodiment of the invention, the apparatus, a holder 30 for AFM probes, is fabricated from a chemically inert material (PTFE) having a cylindrical shape. As is depicted in FIG. 1, this holder 30 comprises two cylindrical parts, a first part 4 and a second part 14.

Figure 2:
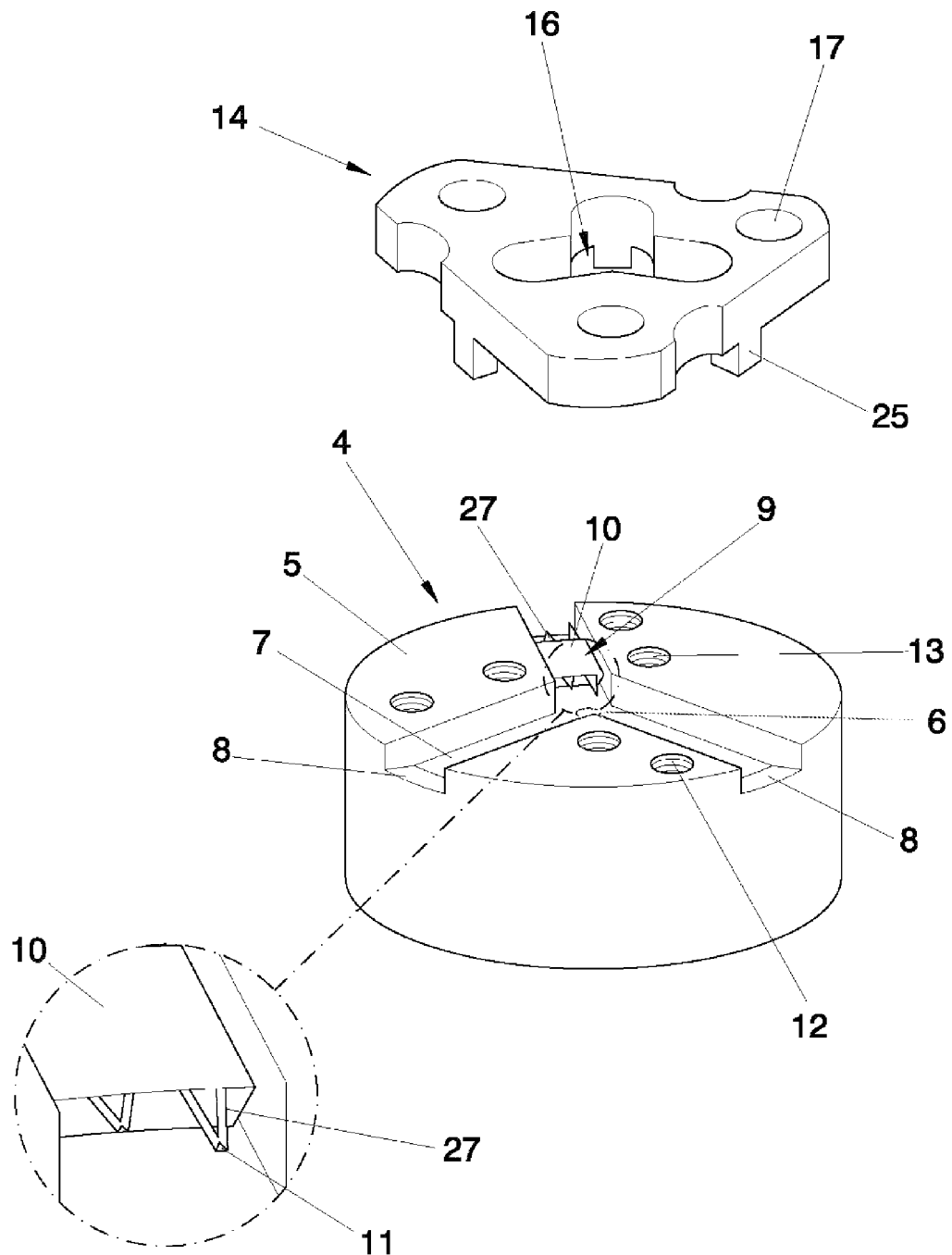
FIG. 2 shows an exploded view of a detailed part of an embodiment of the invention.
Figure 3:
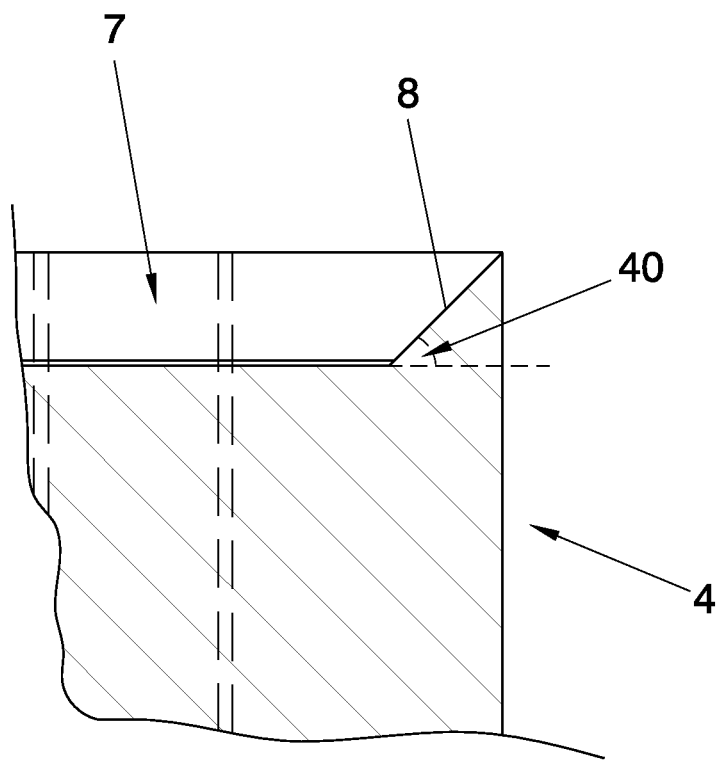
FIG. 3 shows a cross section view of a detailed part of an embodiment of the invention.

In the present embodiment, the first part of the holder 4 as shown in FIG. 2 has a substantially flat surface 5 with three probe receptacles formed by the grooves 7 in order to accommodate three surfaces that are AFM probes 9. The AFM probes 9 in the grooves 7 of the probe receptacle can be moved longitudinally along a radial path, but not laterally. As a result, the grooves 7 of the probe receptacle do not touch the cantilevers 27 and tips 11 of the AFM probes 9. As shown in FIG. 3, each groove 7 has tilted edges, being one of its ends a substantially tilted plane 8 forming an angle 40 with the bottom of that groove, and the other being connected to the other grooves. Each groove 7 is 1.6 mm width so that compatibility is ensured with the width (typically 1.5 mm) of the chips 10 from most AFM probes vendors (e.g. Veeco, Olympus, NanoWorld, AppNano, MicroMash, Budgetsensors).

Figure 1:
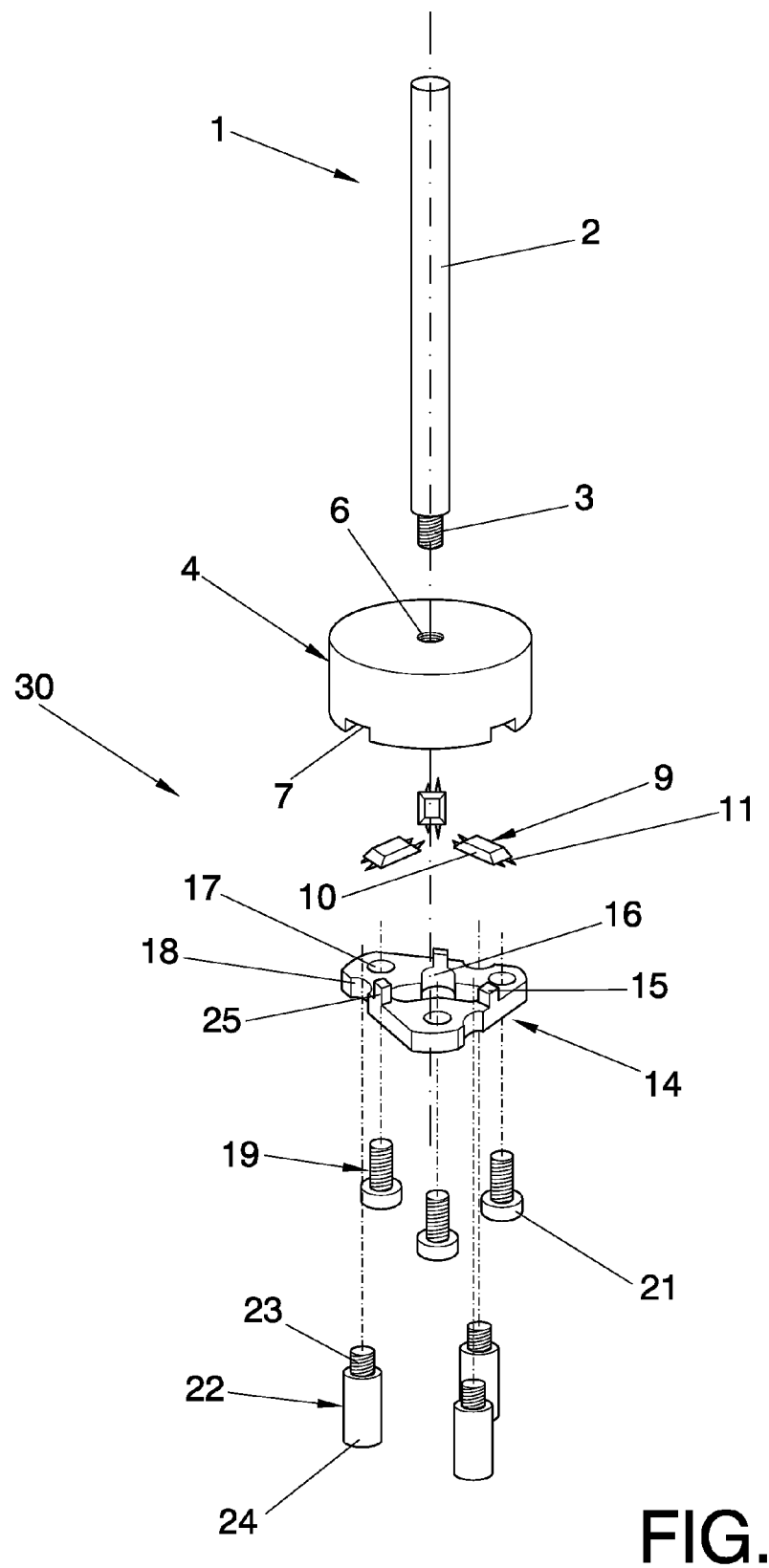
FIG. 1 shows an exploded view of an embodiment of the invention.

FIG. 1 and FIG. 2 show that the first part 4 has three threaded holes 13 to receive fastening means 19 between the first part of the holder 4 and the second part of the holder 14, and three threaded holes 12 to fasten supporting legs 22 by means of screws 23. The fastening means 19 used to fasten the first part 4 of the holder to the second part 14 of the holder are screws 19. The thickness of the head 21 of each screw and the depth of the groove 7 can be tailored to allow visualization of the probes 9 under a microscope.

The second part of the holder 14 presses and blocks the AFM probes 9 in the grooves 7 of the probe receptacle of the first part of the holder 4, by means of three protrusions 25 whose flat surface 15 fits into the grooves 7 of the probe receptacle and keep the AFM probes 9 in place, pressing the chips 10. There are three unthreaded through-bores 17 to let the screws 19 pass and fit into the three threaded holes 13 of the first part of the holder 4.

The first part of the holder 4 can be placed face-down by sitting on detachable supporting means, which are three legs 22, each one comprising a threaded end 23 and a rod 24. The second part of the holder 14 has three dips 18 in order to allow screwing the legs 22 to the holes 12 of the first part of the holder 4. The screw length allows adjusting the distance between the tips 11 and the bottom of the vessel.

The removable handle is a shaft 1, which comprises a threaded end 3 and a rod 2. The threaded end 3 is screwed into the first part of the holder 4 into a threaded hole 6. When the shaft 1 is mounted, it can be used to take the assembly 30 out from a container, and place it from one vessel to another during all the functionalisation steps. Eventually, when the assembly is in its face-down position, it can be detached if the user wants to close the container.

During the functionalisation procedure, the legs 22 can be used if there is a concern for any aggregate deposition on the probes 9, such as e.g. during silanisation in liquid. By placing the probes 9 face-down, it can be ensured that aggregates that may form in the silane solution do not deposit at the tip 11 end of the cantilever 27, which otherwise could not be removed by the standard technique of extensive sonication. Moreover, the legs 22 keep the AFM probes 9 at a distance from the bottom of the solution container where aggregates deposit, thus leaving the tips 11 surrounded by the pure solution. The legs 22 can be detached to allow visualization of the cantilevers 27 under the microscope without taking the AFM probes 9 out of the holder 30. The air that is trapped in the hole 16 when the holder is in a face-down position escapes through the bore 6 when the shaft 1 is removed. The tilted end 8 of the grooves 7 of the probe receptacle facilitates air bubble escape when the holder is in a face-down position.

The central element of the second part of the holder 14 has a hole 16 which allows direct access to the grooves 7 of the probe receptacle of the first part of the holder. During the functionalisation procedure, if the holder 3 is face-up, the grooves 7 of the probe receptacle can be filled with any liquid, such as a solution of functional molecules. The volume of liquid that can cover the AFM probes 9 in the grooves 7 of the probe receptacle is less than 100 micro liters.

A method is described comprising the following steps:

1) At least one AFM probe 9 with at least one cantilever 27 with a tip 11 is placed in the probe receptacle of the first part 4 of the holder in a face-up position. The first part 4 of the holder is covered with the second part 14 of the holder, with the protrusion 25 aligned with the AFM probe 9 so that this protrusion is contacting only the chip 10. After that, the first part 4 and the second part 14 are fastened using the screws 19.

The legs 22 and shaft 1 are screwed to the first part 4 of the holder 30, which is turned upside-down, so that the tips 11 of the probe point downwards, in a face-down position.

2) The tips 11 of the AFM probe 9 are cleaned by dipping the holder 30 (with the tips 11 and cantilevers 27 face-down) into a Piranha solution ($H_2SO_4/H_2O_2$ 7:3).

3) In case of silicon (nitride) probes. All clean AFM probes 9 with their tips 11 are immediately silanised to avoid deactivation of the surface. For liquid phase aminosilanisation, the holder 30 with the cleaned tips 11 of AFM probe 9 is immediately immersed face-down in a solution of 3-aminopropyldimethylethoxysilane (APTES) in dry toluene. The holder 30 ensures that the tips 11 are in a face-down position, and the holder legs 22 ensure that they are far from the bottom surface, where aggregates may deposit. For gas phase aminosilanisation, the holder 30 can be placed in a Duran-Schott desiccator in aprotic conditions. APTES and TEA (tetra-ethylene-amine) are separately placed on a PTFE stage inside the desiccator alongside with the AFM probe 9, which are incubated for 2 days to allow for "curing" of the APTES layer.

4) For cross-linker coupling of the tips 11 of AFM probe 9, the holder 30 is placed in a solution of a reactive linker and successively functionalised in three cycles with an unreactive shorter linker molecule to form an underbrushed layer. For instance the reactive linker can be a Poly Ethylene Glycol (PEG) having a molecular weight (MW) of 5000 (PEG80), while a shorter PEG chain (PEG50, MW 3000) can form the underbrushed layer which prevents non-specific adsorption.

5) The legs 22 and the shaft 1 are detached from the holder 30. The holder 30 is turned into a face-up position.

6) A small volume of biomolecule-containing solution fills the grooves 7 of the probe receptacle for functionalisation of the tips 11 of AFM probe 9. For instance, a thiol-containing biomolecule can be coupled to the thiol-reactive outer end of a (PEG). In such a way only small amounts of expensive material is used, and can also possibly be retrieved.

In another embodiment of the method presented above, the probes are washed after the steps 1, 2, 3, 4 and 5. Both intermediate and final washes can be performed by immersing face-down the AFM probes 9 in different washing solutions placed in different containers, while the AFM probes 9 are still mounted in the holder 30 and handled by means of the shaft 1.

In another embodiment of the method presented above, the shaft 1 can be detached so that air can escape through the bore 6 in order to let air bubbles escape when the holder 30 in a face-down position.

It is possible, using Time of Flight Secondary Ion Mass Spectrometry (TOF-SIMS), to analyse the presence of chemical species on a surface. In this case, TOF-SIMS spectra were acquired to analyse the presence of contaminants before and after tip cleaning, and after tip functionalisation. The resolution in depth of the technique is 1 nm. A $Bi3^{++}$ beam was rastered over a 500 μm×500 μm surface and the total ion dose for each analysis was $2 \times 10^{11}$ ions/cm².

Figure 4:
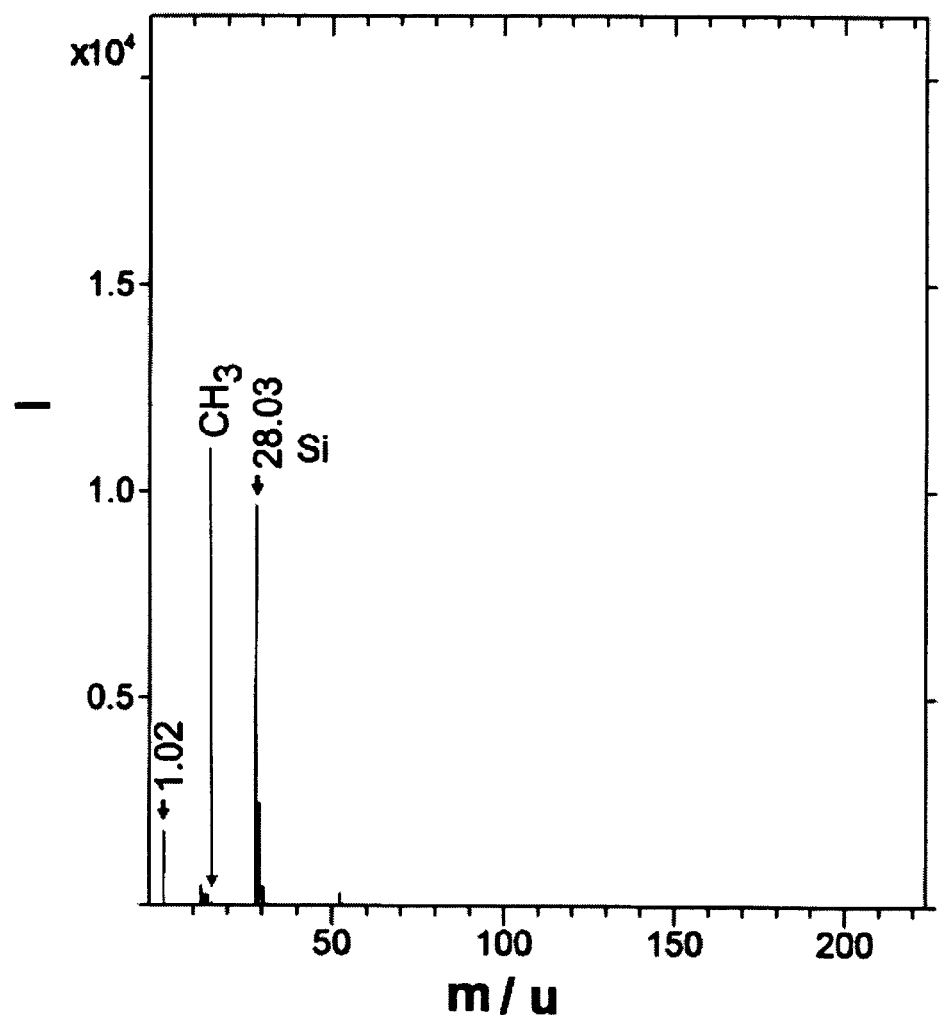
FIG. 4 shows a spectrum Time of Flight Secondary Ion Mass Spectrometry of AFM probes.
Figure 4:
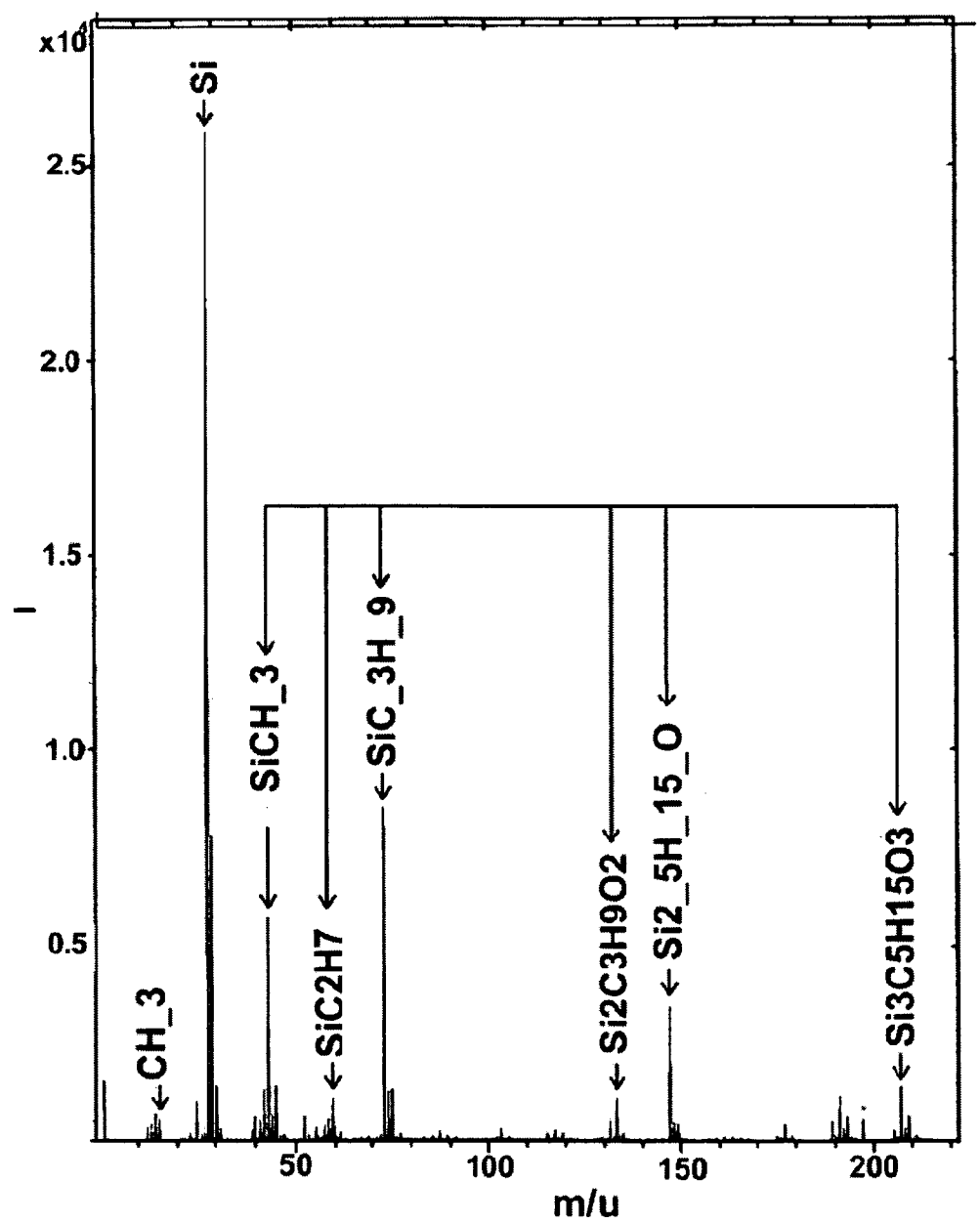

High mass resolution spectra were obtained. Initially, spectra of non-functionalised $Si_3N_4$ probes were acquired. FIG. 4A shows the spectrum, i.e. the intensity I vs. the mass m in unified atomic mass unit (u), of a freshly piranha-cleaned probe, which served as a negative control. On the other hand, it can be observed that as-received probes are extensively covered by siloxane residues (FIG. 4B), probably coming from packaging and air-borne contaminants.

Figure 5:
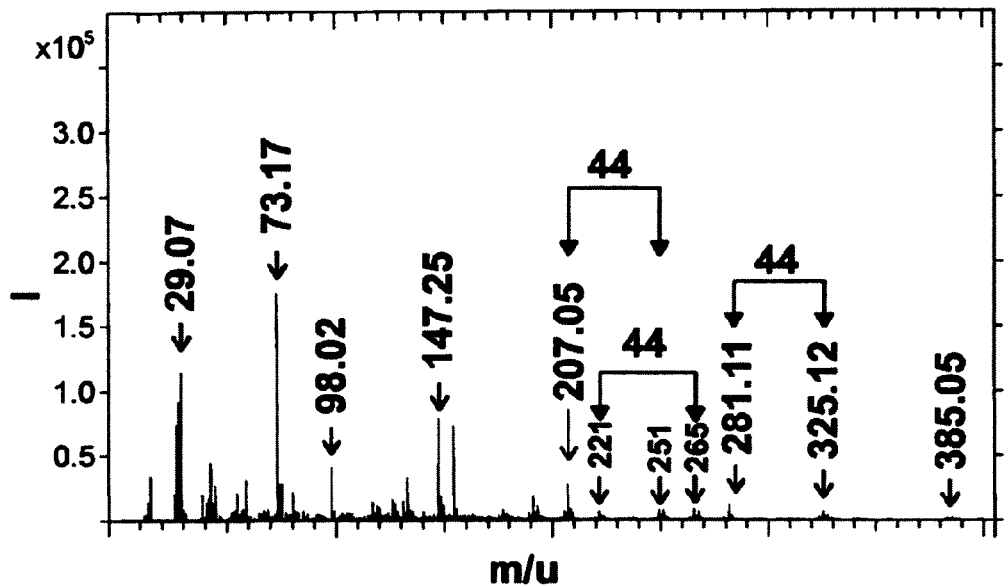
FIG. 5 shows a spectrum Time of Flight Secondary Ion Mass Spectrometry of functionalised AFM probes.
Figure 5:
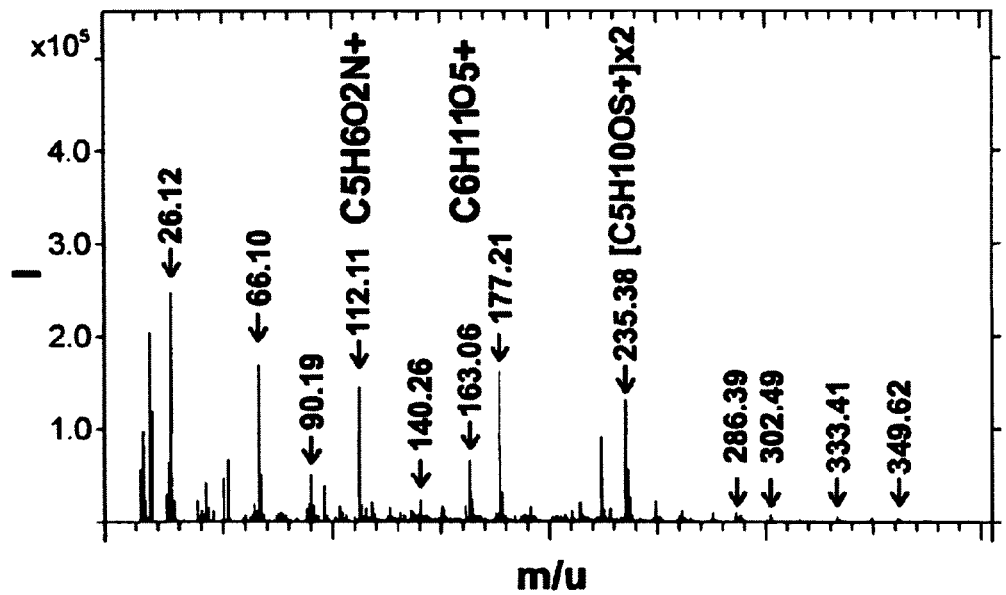

The spectra of functionalised probes using the method described above are strikingly different from the ones of the clean probe. The spectrum of the PEG-functionalised tip (FIG. 5A) shows peaks with an interval of 44 u ($[CH_2CH_2O-]_n$) which allows concluding unambiguously that these peaks correspond to ethylene-glycol monomers. The spectrum of mannose-C5-functionalised probes (FIG. 5B) shows peaks corresponding to the rupture of the glycoxydic bond (m=163.06 u) and to the rupture of the C5 linker (m=112.11 u and m=235.58 u).

As those skilled in the art will appreciate, other various modifications, extensions, and changes to the foregoing disclosed embodiments of the present invention are contemplated to be within the scope and spirit of the invention as defined in the following claims.

The invention claimed is:

1. An apparatus comprising:
a) a first part comprising at least one probe receptacle with a groove,
wherein a bottom of the groove is substantially flat, and dimensioned to allow a chip of an AFM probe to move along a longitudinal direction of the groove and to constrain the movement of the chip along a transverse direction, and wherein the grove comprises at one end a substantially tilted plane forming an angle with the bottom of the groove, to facilitate escape of the air bubbles from the at least one probe receptacle in a face-down position of the apparatus;
b) a second part comprising a protrusion,
wherein a contact area of the protrusion is smaller than the dimensions of the chip, and the protrusion aligns with the at least one probe receptacle when the first and second part are assembled; and
c) a fastening element to fasten the first part to the second part;
wherein a surface of the apparatus comprises a material having a friction coefficient lower than 0.04, and having an adhesive behaviour sufficiently low to avoid adhesion of the AFM probe, wherein the material is chemically inert, and
wherein the apparatus is suitable for holding an AFM probe during a functionalization process, the AFM probe comprising a chip, at least one cantilever, and a tip.

2. The apparatus of to claim 1, wherein the apparatus comprises a low friction, low adhesion, and chemically inert material.

3. The apparatus of claim 1, wherein the apparatus comprises three probe receptacles.

4. The apparatus of claim 1, wherein the second part comprises a central hole enabling direct access to the at least one probe receptacle.

5. The apparatus of claim 1, wherein the at least one probe receptacle comprises a hole to communicate the at least one probe receptacle with any other face of the first part.

6. The apparatus of claim 1, further comprising a supporting element.

7. The apparatus of claim 6 wherein the supporting element is detachable.

8. The apparatus of claim 1, further comprising a handle element.

9. The apparatus of claim 8 wherein the handle element is a shaft.

10. The apparatus of claim 1, wherein the fastening element is a screw.

11. The apparatus of claim 1, wherein a stiffness of a portion of the first part or the second part is substantially softer than the AFM probe.

12. A method for the functionalization of AFM probes, the method comprising:
a) placing at least one AFM probe in the at least one probe receptacle of the first part of the apparatus of claim 1 in a face-up position, holding the AFM probe with the apparatus and turning the apparatus so that the tip of the AFM probe is pointing downwards;
b) cleaning the AFM probe by immersing the apparatus in an etching solution;
d) functionalizing the AFM probe with a reactive linker and a filler layer of shorter, unreactive linkers;
e) placing the apparatus with the tlip of the AFM probe pointing upwards; and
f) functionalizing the AFM probe by filling the groove with a solution that contains molecules of interest.

13. The method of claim 12, further comprising, after any of the a), b), d), e), and f),
washing the AFM probe by immersing face-down the AFM probe in a different washing solution while the AFM probe is still mounted in the apparatus.

14. The method of claim 12, wherein a shaft of the apparatus is detached thereby permitting air to escape through a hole in the at least one probe receptacle.

15. The method of claim 12, further comprising,
c) silanizing the AFM probe,
wherein the AFM probe comprises silicon.

* * * * *